US012737974B2

(12) United States Patent
Seo

(10) Patent No.: US 12,737,974 B2
(45) Date of Patent: Sep. 15, 2026

(54) METHOD AND APPARATUS FOR IMPROVING VISUAL COHERENCY ON RENDERING 3D REAL OBJECTS VIRTUALIZED IN EXTENDED REALITY

(71) Applicant: ELECTRONICS AND TELECOMMUNICATIONS RESEARCH INSTITUTE, Daejeon (KR)

(72) Inventor: Byung Kuk Seo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 265 days.

(21) Appl. No.: 18/661,924

(22) Filed: May 13, 2024

(65) Prior Publication Data

US 2025/0054232 A1 Feb. 13, 2025

(30) Foreign Application Priority Data

Aug. 11, 2023 (KR) ........................ 10-2023-0105318

(51) Int. Cl.
*G06T 17/00* (2006.01)
*G06T 19/00* (2011.01)
*G06T 15/04* (2011.01)

(52) U.S. Cl.
CPC ............ *G06T 17/00* (2013.01); *G06T 19/006* (2013.01); *G06T 15/04* (2013.01)

(58) Field of Classification Search
CPC ........ G06T 17/00; G06T 19/006; G06T 15/04
See application file for complete search history.

(56) References Cited

U.S. PATENT DOCUMENTS 11,481,955 B2 10/2022 Bakalash et al.
2013/0120372 A1 5/2013 Lee et al.
(Continued)

FOREIGN PATENT DOCUMENTS

EP 3246880 A1 * 11/2017 ............. G06T 11/10
KR 10-2018-0132308 A 12/2018
(Continued)

OTHER PUBLICATIONS

Zhang et al., "Learning RAW-to-sRGB Mappings with Inaccurately Aligned Supervision", 2021, 10.48550/arXiv.2108.08119. (Year: 2021).*

(Continued)

*Primary Examiner* — Michelle L Sams
(74) *Attorney, Agent, or Firm* — LRK PATENT LAW FIRM

(57) ABSTRACT

Proposed is a rendering method and device for providing extended reality experiences. The rendering method includes obtaining image data in a first condition by an image data sensing part, the image data including a target real object to be virtualized, deriving a raw-to-sRGB conversion matrix on the basis of the obtained image data in the first condition by a raw-to-sRGB conversion estimation part, generating texture data of the target real object by using the raw-to-sRGB conversion matrix by an object texture data conversion generation part, virtualizing the target real object by using the object texture data and generating a virtualized real object by a real-time processing part, and rendering the virtualized real object by an object/background rendering part.

10 Claims, 7 Drawing Sheets

(56) References Cited

U.S. PATENT DOCUMENTS

| | | | | |
|---|---|---|---|---|
| 2013/0286162 | A1 | 10/2013 | Lee et al. | |
| 2018/0160038 | A1* | 6/2018 | Thumpudi | H04N 1/6008 |
| 2023/0196673 | A1 | 6/2023 | Yun et al. | |

FOREIGN PATENT DOCUMENTS

| | | | |
|---|---|---|---|
| KR | 10-2022-0089836 | A | 6/2022 |
| KR | 1020210023671 | B1 | 6/2022 |
| KR | 10-2023-0094185 | A | 6/2023 |

OTHER PUBLICATIONS

Oscar De Lama, "Developing a RAW photo file 'by hand' —Part 2", Blog, Dec. 31, 2020, pp. 1-24, https://www.odelama.com/photo/Developing-a-RAW-Photo-by-hand/Developing-a-RAW-Photo-by-hand_Part-2/.

* cited by examiner

FIG. 5 image data captured by a camera in an extended reality environment extended reality experience environment target real object to be virtualized The 3D object model (shape and texture) of a target real object to be virtualized is generated offline.

image data captured by a camera in an extended reality environment

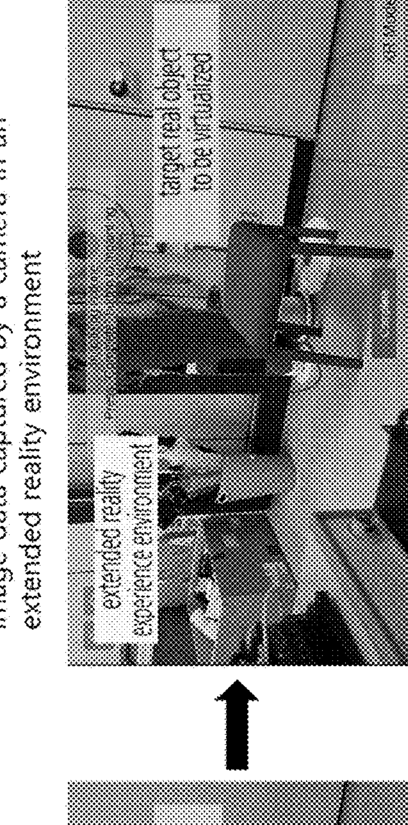

Target real object to be virtualized (a target real object and its corresponding 3D model are aligned in a real-time camera image)

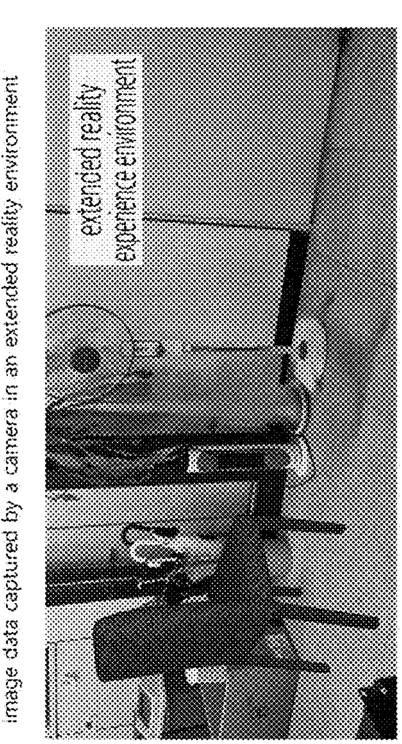
FIG. 6

METHOD AND APPARATUS FOR IMPROVING VISUAL COHERENCY ON RENDERING 3D REAL OBJECTS VIRTUALIZED IN EXTENDED REALITY

CROSS REFERENCE TO RELATED APPLICATION

The present application claims priority to Korean Patent Application No. 10-2023-0105318, filed 11 Aug. 2023, the entire contents of which are incorporated herein for all purposes by this reference.

BACKGROUND OF THE INVENTION

1. Field of the Invention

The present disclosure relates to a rendering method and device for improving the visual coherence of a virtualized real object for highly immersive experiences in virtual placement-based interaction (for example, movement or rotation) with a real object in extended reality environments.

2. Description of Related Art

Recently, extended reality technology, which is a combination of existing virtual reality, augmented reality, and mixed reality, has attracted attention. In extended reality, virtual and real worlds are mixed to provide various interactions with a user for highly immersive and realistic experiences. In particular, it is possible for a virtual object augmented in a real space to reflect and express various types of environmental information of the real space. For example, a virtual object reflects lighting information of the real space and expresses shadows accordingly, or reflects 3D information of the real space and expresses collision with a real object or occlusion of the virtual object by a real object.

In the field of computer graphics, realistic rendering technology has long been developed and has been recognized as an important technology for realistic augmentation of virtual objects in extended reality. In particular, when a target of interaction in extended reality is a real object, which is the focus of the present disclosure, a real object existing in a real space is immediately virtualized in an extended reality experience environment to provide various interactions, compared to simply augmenting a virtual object not existing in a real space in existing augmented reality. Therefore, it is recognized that the visual coherence of a virtualized real object is more important for users.

However, most existing realistic rendering technologies focus on reconstructing lighting information of a real space or on realistic rendering techniques, so there is a limitation in reducing the visual sense of heterogeneity or incongruity through modeling a camera imaging process.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to improve the visual coherence of a real object virtualized in extended reality by converting the texture of a target real object model pre-generated through modeling a camera imaging process to be suitable for an extended reality experience environment.

According to the present disclosure, there is provided a rendering method for extended reality, the rendering method including: obtaining, by an image data sensing part, image data in a first condition, the image data including a target real object to be virtualized; deriving, by a raw-to-sRGB conversion estimation part, a raw-to-sRGB conversion matrix on the basis of the obtained image data in the first condition; generating, by an object texture data conversion generation part, the texture data of the target real object by using the raw-to-sRGB conversion matrix; virtualizing, by a real-time processing part, the target real object by using the object texture data and generating a virtualized real object; and rendering, by an object/background rendering part, the virtualized real object and providing extended reality experiences.

In addition, the generating of the texture data of the target real object to be virtualized by using the raw-to-sRGB conversion matrix by the object texture data conversion generation part comprises deriving a raw-to-raw conversion matrix for estimating raw-to-raw conversion, on the basis of the image data in the first condition and image data in a second condition; and performing conversion into the texture data of the target real object on the basis of the raw-to-raw conversion matrix, and generating the texture data of the target real object by using the raw-to-sRGB conversion matrix.

In addition, the first condition may include a characteristic of lighting or a characteristic of a camera in an environment in which extended reality experiences are provided or both, and the second condition may include a characteristic of lighting or a characteristic of a camera in an environment in which a 3D modeling part operates offline or in a pre-test environment, or both.

In addition, the deriving of the raw-to-sRGB conversion matrix on the basis of the obtained image data by the raw-to-sRGB conversion estimation part comprises deriving the raw-to-sRGB conversion matrix on the basis of a reference color chart raw image data and a reference color chart sRGB image data included in the image data of the first condition.

In addition, the rendering method may further include: receiving user input for the virtualized real object; and outputting a screen with updated interaction corresponding to the user input.

In addition, according to the present disclosure, there is provided a rendering device including: an image data sensing part configured to obtain image data in a first condition, the image data including a target real object to be virtualized; a raw-to-sRGB conversion estimation part configured to derive a raw-to-sRGB conversion matrix on the basis of the obtained image data in the first condition; an object texture data conversion generation part configured to generate the texture data of the target real object by using the raw-to-sRGB conversion matrix; a real-time processing part configured to virtualize the target real object by using the object texture data and generate a virtualized real object; and an object/background rendering part configured to render the virtualized real object and to provide extended reality experiences.

In addition, when generating the texture data of the target real object to be virtualized by using the raw-to-sRGB conversion matrix, the object texture data conversion generation part is configured to derive a raw-to-raw conversion matrix for estimating raw-to-raw conversion, on the basis of the image data in the first condition and image data in a second condition, perform conversion into the texture data of the target real object on the basis of the raw-to-raw conversion matrix, and generate the texture data of the target real object by using the raw-to-sRGB conversion matrix.

In addition, the first condition may include a characteristic of lighting or a characteristic of a camera in an environment in which extended reality experiences are provided or both, and the second condition may include a characteristic of lighting or a characteristic of a camera in an environment in which a 3D modeling part operates offline or in a pre-test environment, or both.

In addition, when deriving the raw-to-sRGB conversion matrix on the basis of the obtained image data, the raw-to-sRGB conversion estimation part is configured to derive the raw-to-sRGB conversion matrix on the basis of a reference color chart raw image data and a reference color chart sRGB image data included in the image data of the first condition.

In addition, user input for the virtualized real object may be received, and a screen with updated interaction corresponding to the user input may be output.

According to the configuration of the present disclosure, the texture data of a target real object pre-generated through modeling a camera imaging process is converted to be suitable for an extended reality experience environment.

This can improve the visual coherence of a virtualized real object in an extended reality experience environment.

In addition, virtual placement-based interaction (for example, movement or rotation) with a real object can provide highly immersive extended reality experiences as if the user were placing the real object in person.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 5 shows a visualization of an extended reality experience according to an embodiment of the present disclosure;

FIG. 6 shows a visualization of an extended reality experience according to an embodiment of the present disclosure.

DETAILED DESCRIPTION OF THE INVENTION

Figure 1:
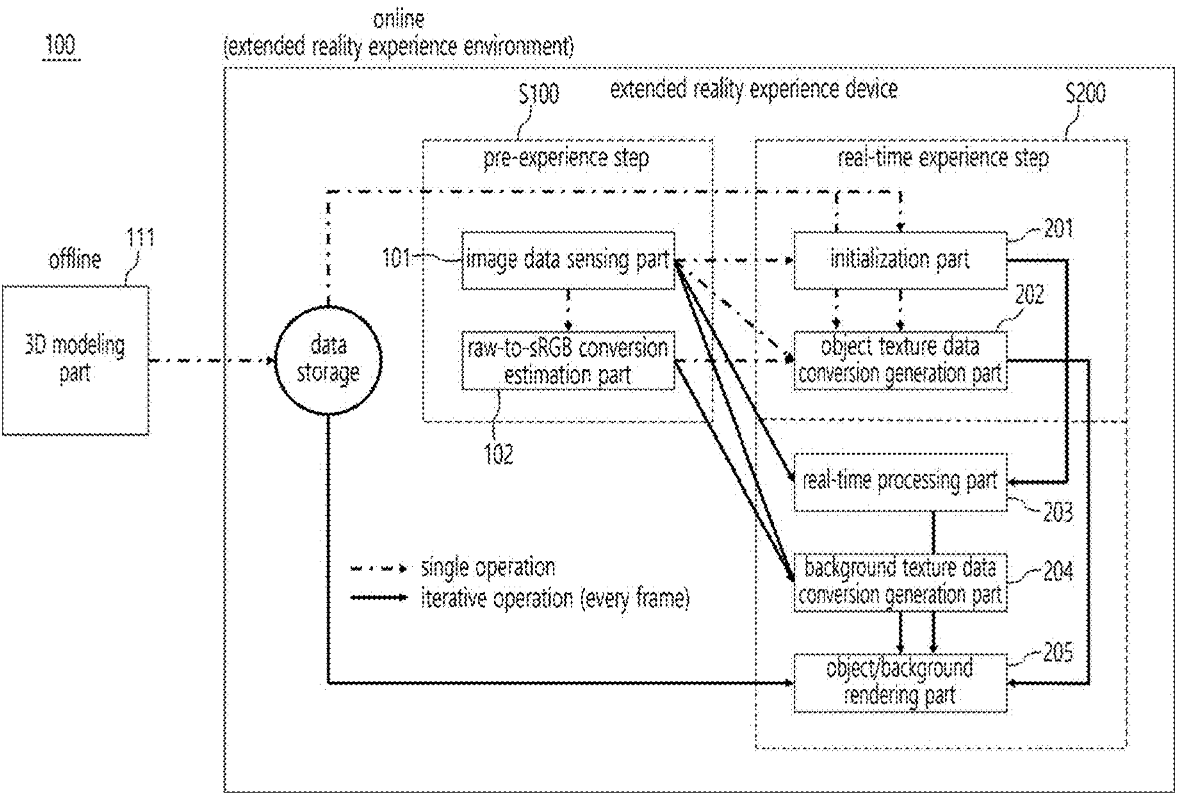
FIG. 1 is a block diagram illustrating object/background rendering for improving the visual coherence of a real object virtualized in extended reality according to an embodiment of the present disclosure.

A variety of modifications may be made to the present disclosure and there are various embodiments of the present disclosure, particular embodiments of the present disclosure are illustrated in the drawings and will be described in detail. However, the present disclosure is not limited thereto, and the exemplary embodiments can be construed as including all modifications, equivalents, or substitutes in a technical concept and a technical scope of the present disclosure.

Throughout the description, it should be understood that when an element is referred to as being "connected" to another element, it can be "directly connected" to the other element or "electrically connected" thereto with intervening elements therebetween.

Terms "first", "second", "A", "B", etc. can be used to describe various elements, but the elements are not to be construed as being limited to the terms. The terms are only used to differentiate one element from the other elements. For example, the "first" element may be named the "second" element without departing from the scope of the present disclosure, and the "second" element may also be similarly named the "first" element. The term "and/or" includes a combination of a plurality of items or any one of a plurality of terms.

In the terms used herein, an expression used in the singular encompasses the expression of the plural, unless the context clearly means otherwise. It will be furthermore understood that the terms "comprises", "comprising", "includes", and "including" specify the presence of stated features, numbers, steps, operations, elements, components, or combinations thereof, but do not preclude the presence or addition of one or more other features, numbers, steps, operations, elements, components, or combinations thereof.

Before providing a detailed description of the drawings, it would be clarified that the division of elements in the present disclosure is merely a division according to the main functions each element is responsible for. That is, two or more elements, which will be described below, may be combined into one element, or one element may be divided into two or more parts for more detailed functions. In addition to the main functions that each element is responsible for, each of the elements may additionally perform some or all of the functions that the other elements are responsible for. Some of the main functions each element is responsible for may be handled and performed by the other elements.

In addition, in performing a method or an operation method, steps constituting the method may occur in an order different from an order described herein unless a specific order is clearly stated in context. In other words, the steps may be performed in the same order as described, may be performed substantially simultaneously, or may be performed in the reverse order.

Hereinafter, it will be described that a rendering device 100 performs operations according to an embodiment of the present disclosure. The rendering device 100 is a device that processes input data consistently and performs necessary operations according to a particular model or algorithm. For example, the rendering device may be realized in the form of a PC, a server on the network, a smart device, or a chipset with an embedded design program.

Alternatively, the rendering device 100 is applicable to a device for providing an extended reality experience through a camera video-based device, so its form may be a PC, a mobile device, or a wearable video see-through HMD device.

First, virtual placement-based interaction (for example, movement or rotation) with real objects placed in a real space in extended reality requires the virtualization of a target real object.

A process of the virtualization of a real object includes detecting and recognizing a target real object from image data of a real space including the target real object to be virtualized obtained by a camera, and searching for a 3D model corresponding to the target real object. Afterward, the 3D model is aligned with the target real object area visible in the obtained image data, thereby achieving the virtualization.

In addition, the visualization is achieved using the virtualized real object as if the user were placing the target real object in person, thereby realizing an extended reality experience.

In the meantime, a target that the user actually interacts with through the extended reality device (used interchangeably with the rendering device) is a virtual object model. Therefore, the closer the virtual object model looks to the real object in the extended reality environment, the more immersive the experience.

Herein, generally, the color information of the virtual model used is rendered and visualized in the extended reality environment using a pre-generated texture of a target real object. Thus, under the lighting of the extended reality environment, there is inevitably a visual sense of heterogeneity or incongruity from the real object shown in the image data obtained through the camera of the extended reality experience device.

In addition, image data of the real space that is finally visualized and shown to the user in the extended reality experience environment is eventually experienced through image data that reflects the characteristics of lighting and the camera in the experience environment.

Therefore, without correction when the lighting and the camera in the texture generation environment for the virtual object model are different from the lighting and the camera in the extended reality experience environment, if pre-generated texture information of the target real object is synthesized with the image data obtained in the extended reality experience environment as it is for visualization, the visual sense of heterogeneity or incongruity will still occur.

In addition, the method may be implemented only for the area of a target real object that is visible from the user's point of view from which the image data is obtained.

That is, when placement-based interaction (for example, movement or rotation) with a virtualized real object occurs in a situation, such as extended reality, in which the user's actual point of view does not change significantly, there is a limitation that it is impossible to generate texture data through only image data acquisition from the user's point of view for the hidden back of the target real object actually invisible from the user's point of view.

The present disclosure is described to solve the above limitation.

Generally, image data obtained by capturing a real object in a real space with a camera may be described by a process in which lighting around the real object reflects off the real object and is obtained as the color response intensity of the camera sensor. This may be simply expressed as follows.

[Equation 1]

$$I_{raw_i} = \int_{\Omega} l(\lambda)\, r(\lambda)\, s_{c_i}(\lambda)\, d\lambda$$

Herein, $I_{raw_i}$ denotes the i-th channel color response intensity of the camera sensor, $l(\lambda)$ denotes the spectral power distribution of the lighting, $r(\lambda)$ denotes the inherent spectral reflectance of the surface of the real object, $s_{c_i}(\lambda)$ denotes the i-th channel color response of the camera sensor, and $\Omega$ denotes the visible light spectrum (about 400 to 700 nm).

In addition, assuming that the camera image data processing function is denoted by g, the RGB image data usually used, that is, sRGB (standard RGB) image data $I_{SRGB}$, may be generated from the raw image data $I_{raw}$.

$$I_{sRGB} = g(I_{raw}) \quad \text{[Equation 2]}$$

That is, assuming that the sRGB image data obtained using the lighting and the camera in an environment in which 3D shape and texture information are generated ($\lambda$) is denoted by $$I^A_{sRGB}$$

and the sRGB image data obtained using the lighting and the camera in an environment in which extended reality experiences are provided (hereinafter, in the present disclosure, referred to as an extended reality experience environment) (B) is denoted by $$I^B_{sRGB},$$

these may be expressed as different values as follows.

[Equation 3]

$$I^A_{sRGB} \neq I^B_{sRGB}$$

$$g^A\left(I^A_{raw}\right) \neq g^B\left(I^B_{raw}\right)$$

The present disclosure is intended to reduce the visual sense of heterogeneity or incongruity by not using $$I^A_{sRGB}$$

directly, but converting this to $$I^B_{sRGB}$$

and rendering it instead, to be suitable for the extended reality experience environment.

Hereinafter, a method of virtualizing a real object by a rendering device 100 for interaction with the real object existing in a real space in extended reality will be described.

FIG. 1 is a block diagram illustrating object/background rendering for improving the visual coherence of a real object virtualized in extended reality according to an embodiment of the present disclosure.

The components of the rendering device 100 shown in FIG. 1 are exemplary. Only some of the components shown in FIG. 1 may constitute the rendering device 100, or additional component(s) in addition to the components shown in FIG. 1 may be included in the rendering device 100.

The rendering device 100 according to an embodiment of the present disclosure may include a 3D modeling part 111.

The 3D modeling part 111 may generate 3D shape and texture information of a target real object to be virtualized in an extended reality experience environment in advance.

According to an embodiment of the present disclosure, it is preferable that the 3D modeling part 111 obtains and uses raw image data of the target real object when generating its texture information (hereinafter, in the present disclosure, referred to as object raw texture data).

In addition, a variety of existing methods may be applied to the 3D modeling process.

The 3D modeling part 111 may place a reference color chart (or Macbeth color checker chart) near a target real object (for example, its foreground or background) when obtaining image data, and may also obtain image data of the chart together.

The operation of the 3D modeling part 111 may be performed offline or in a pre-test environment.

According to an embodiment of the present disclosure, the 3D modeling part 111 may be used to obtain data offline, and extended reality may be realized later in the extended reality experience environment (online or on-site).

Herein, the rendering device 100 may perform object and background rendering for improving the visual coherence of a virtualized real object.

According to an embodiment of the present disclosure, the rendering device 100 (hereinafter, used interchangeably with an extended reality experience device) completes 3D modeling offline and then performs a pre-experience step S100 and a real-time experience step S200 in the extended reality experience environment.

First, the pre-experience step S100 will be described with reference to FIG. 2.

Figure 2:
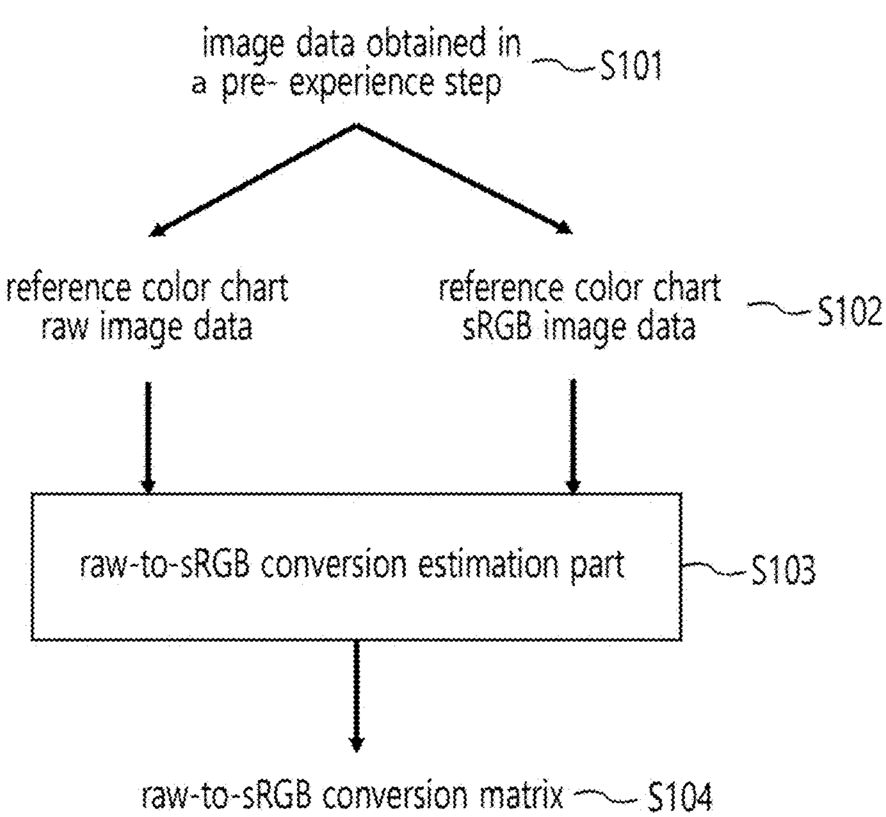
FIG. 2 shows a process of computing a conversion matrix according to an embodiment of the present disclosure.

FIG. 2 shows a process of computing a conversion matrix according to an embodiment of the present disclosure.

Referring to FIG. 2, the pre-experience step S100 may be performed through an image data sensing part 101 and a raw-to-sRGB conversion estimation part 102 for information required in the real-time experience step S200.

Specifically, the image data sensing part 101 may obtain sRGB image data and raw image data of an extended reality experience environment including a target real object to be virtualized in step S101.

The image data sensing part 101 may include a camera, and may include various cameras, such as single or multiple cameras, and a depth camera, as well as various other sensing devices (for example, an IMU).

In addition, the image data sensing part 101 may place the reference color chart (or Macbeth color checker chart) near the target real object (for example, its foreground or background) in order to extract the camera characteristic of the rendering device in the pre-experience step S100, and may obtain raw image data and sRGB image data of the reference color chart together in step S102.

The obtained data may be transmitted to the raw-to-sRGB conversion estimation part 102in step S103.

The raw-to-sRGB conversion estimation part 102 may derive a raw-to-sRGB conversion matrix on the basis of the obtained raw image data and sRGB image data of the reference color chart in step S104.

The raw-to-sRGB conversion matrix ($\tilde{P}_{raw \rightarrow sRGB}$) may be estimated using Equation below.

[Equation 4]

$$\tilde{P}_{raw \rightarrow sRGB} = \underset{P_{raw \rightarrow sRGB}}{\arg\min} \sum_{i \in C} \left\| I^{B}_{sRGB_i} - P_{raw \rightarrow sRGB} I^{B}_{raw_i} \right\|^2$$

Herein, C denotes the patch areas of the reference color chart, and B denotes the extended reality experience environment. The pre-experience step S100 may be performed as a single operation, and then the real-time experience step S200 may be repeated every frame.

Hereinafter, the real-time experience step S200 will be described.

According to an embodiment of the present disclosure, the real-time experience step S200 may include an initialization step performed including an initialization part 201, and an iteration step performed repeatedly every frame thereafter.

According to an embodiment of the present disclosure, the initialization part 201 may detect and recognize the target real object from the image data and may search for a 3D model corresponding to the target real object and align the 3D model on the image data as a target real object virtualization process for the extended reality experience.

Afterward, object sRGB texture data reflecting the extended reality experience environment may be generated through an object texture data conversion generation part 202.

Figure 3:
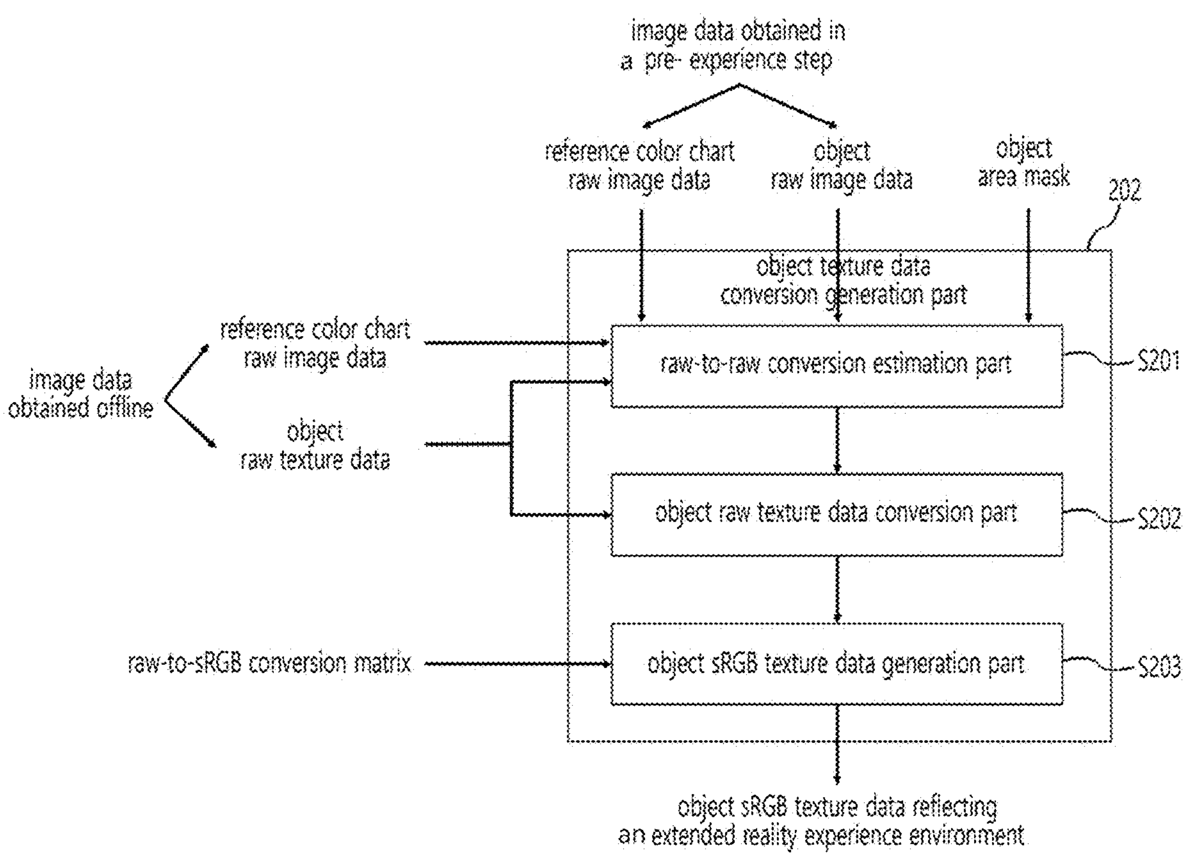
FIG. 3 shows an object texture data conversion process according to an embodiment of the present disclosure.

FIG. 3 shows a process of generating object sRGB texture data by the object texture data conversion generation part 202 according to an embodiment of the present disclosure.

Referring to FIG. 3, the object texture data conversion generation part 202 may use the raw-to-raw conversion estimation part to calculate a raw-to-raw conversion matrix in step S201.

Specifically, the raw image data of the reference color chart and the object raw image data obtained in the pre-experience step S100, and the raw image data of the reference color char and the object raw texture data obtained in the offline step and stored in data storage may be used to calculate the raw-to-raw conversion matrix.

Equation 5 is to estimate the raw-to-raw conversion matrix ($\tilde{M}_{raw \rightarrow raw}$) when the raw-to-raw image data pairs for the patch areas of the reference color chart are given.

[Equation 5]

$$\tilde{M}_{raw \rightarrow raw} = \underset{M_{raw \rightarrow raw}}{\arg\min}\, e_C^2 = \underset{M_{raw \rightarrow raw}}{\arg\min} \sum_{i \in C} \left\| I^{B}_{raw_i} - M_{raw \rightarrow raw} I^{B}_{raw_i} \right\|^2$$

Herein, C denotes the patch areas of the reference color chart, and $$e_c^2$$

denotes the sum of the squared errors of pixel values in the patch areas of the reference color chart. In addition, B denotes the extended reality experience environment, and A denotes the offline 3D modeling generation environment in the 3D modeling part 111.

Equation 6 is to estimate the raw-to-raw conversion matrix ($\tilde{M}_{raw \rightarrow raw}$) further considering a condition for the visible area of the target real object in the image data obtained in the pre-experience step S100 according to an embodiment of the present disclosure.

[Equation 6]

$$\tilde{M}_{raw \rightarrow raw} = \underset{M_{raw \rightarrow raw}}{\arg\min} \sum e_C^2 \text{ subject to } e_{f_v} = 0$$

Herein, $f_v$, denotes the visible area of the target real object in the image data obtained in the pre-experience step S100, and $e_{f_v}$ denotes the sum of errors of the pixel values in $f_v$. Equation 7 is a restatement of Equation 6 in the same way as Equation 5 (f: foreground, b: background).

[Equation 7]

$$\tilde{M}_{raw\to raw} = \underset{M_{raw\to raw}}{\arg\min} \sum_{i\in C} \left\| I^B_{raw_i} - M_{raw\to raw} I^A_{raw_i} \right\|^2$$

$$\text{subject to } I^B_{raw_{f_v}} = M_{raw\to raw} T^A_{raw_{f_v}}$$

Herein, $$I^B_{raw_{f_v}}$$

denotes the raw image data of the target real object area (determined using an object area mask obtained after the model alignment of the initialization part 201) obtained in the pre-experience step S100, and $$T^A_{raw_{f_v}}$$

denotes the object raw texture data of the area corresponding to $$I^B_{raw_{f_v}}$$

obtained offline in advance in the 3D modeling part 111 (in other words, the area corresponding to the visible area of the target real object in the raw image data obtained in the pre-experience step S100, from the object raw texture data obtained offline in advance in the 3D modeling part 111).

According to an embodiment of the present disclosure, the conversion matrix obtained through the conversion estimation part may be transmitted to an object raw texture data conversion part in step S202.

The object raw texture data conversion part may perform a process of converting the object raw texture data obtained offline in step S202.

Herein, at the time point when the target real object is to be virtualized in the pre-experience step S100, the image data of the visible area of the real object is determined on the basis of the obtained object raw image data, and the object raw texture data conversion part may apply Equation 7 only to the invisible area (hidden back) of the real object to be virtualized.

Alternatively, according to an embodiment of the present disclosure, in order to maintain the visual coherence between the visible area and the invisible area within a single object texture, the entire object raw texture data obtained offline in the 3D modeling part 111 may be converted. This is expressed as follows.

[Equation 8]

$$T^B_{raw_f} = \begin{cases} \tilde{M}_{raw\to raw} T^A_{raw_{f_v}} & \text{if visible part} \\ \tilde{M}_{raw\to raw} T^A_{raw_{f_h}} & \text{if hidden part} \end{cases}$$

According to an embodiment of the present disclosure, an object sRGB texture data generation part may use the raw-to-sRGB conversion matrix ($\tilde{P}_{raw\to RGB}$) estimated in the pre-experience step S100 shown in FIG. 1 to obtain the object sRGB texture data reflecting the extended reality experience environment as follows in step S203.

[Equation 9]

$$T^B_{sRGB_f} = \tilde{P}_{raw\to sRGB} T^B_{raw_f}$$

FIG. 1 will be described again.

According to an embodiment of the present disclosure, after the step of generating the conversion matrix through the initialization part 201 and the object texture data conversion generation part 202, an iterative operation may be included.

In the iterative operation, extended reality experiences (for example, virtual placement of a real object) may be rendered on the basis of image data obtained in real time by the image data sensing part 101, and the extended reality may be output through a display of the rendering device 100.

Specifically, first, a real-time processing part 203 may perform additional processing (for example, camera tracking, object inpainting, and user input processing such as movement or rotation) required for extended reality experience on the image data obtained in real time by the image data sensing part 101.

In order to provide extended reality experiences through the display of the rendering device 100, the real-time processing part 203 needs to perform rendering a virtualized real object to the image data of a real space obtained in real time through a rendering pipeline of graphics processor unit (GPU).

To this end, in the present disclosure, as texture information of the virtualized real object to be used in the rendering pipeline, the object sRGB texture data obtained according to Equation 9 in the real-time experience step S200 may be used.

In the meantime, even if object texture data suitable for the extended reality experience environment is generated again according to Equation 9, when image data obtained in real time in the real-time experience step S200 is synthesized with the object texture data as its background, the visual artifacts may occur additionally, especially at the boundary between the object and the background.

In the present disclosure, image data obtained in real time is not used as it is, but is converted into background texture data through a background texture data conversion generation part (204).

This will be described in detail with reference to FIG. 4.

Figure 4:
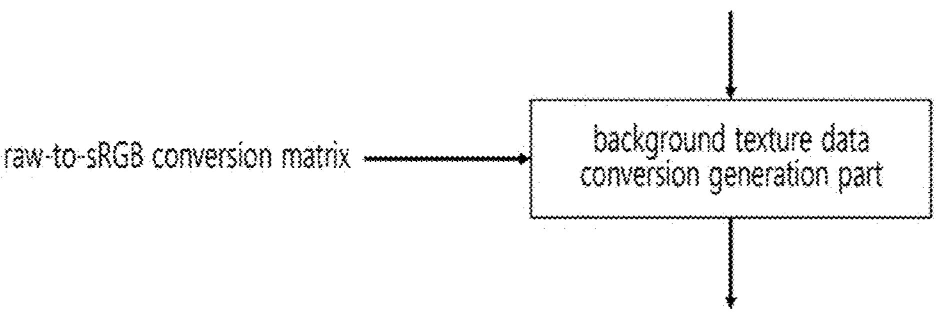
FIG. 4 shows a background texture data conversion process according to an embodiment of the present disclosure.

FIG. 4 shows a process of conversion into background texture data through the background texture data conversion generation part 204 according to an embodiment of the present disclosure.

Referring to FIG. 4, similarly to the object sRGB texture data generation part S203 shown in FIG. 3, the background texture data generation part 204 may use the raw-to-sRGB conversion matrix ($\tilde{P}_{raw\to sRGB}$) estimated as shown in FIG. 2 to convert background raw image data obtained in real time in the real-time experience step S200

$$\left(I^B_{raw_b}\right)$$

into background sRGB texture data reflecting the extended reality experience environment $$\left(T^{B}_{sRGB_b}\right),$$

as shown in Equation 10 below.

$$T^{B}_{sRGB_b} = \tilde{P}_{raw \to sRGB}\tilde{I}^{B}_{raw_b} \quad \text{[Equation 10]}$$

Herein, regarding $$\tilde{I}^{B}_{raw_b},$$

since the operation of the real-time processing part 203 precedes the operation of the background texture data conversion generation part 204, the real-time processing part 203 may perform image data processing, such as inpainting, on the background on the basis of $$I^{B}_{raw_b}.$$

Therefore, in Equation 10, $$\tilde{I}^{B}_{raw_b}$$

is used instead of $$I^{B}_{raw_b}.$$

However, the processing such as inpainting may be performed after the background texture data conversion generation part 204, so there is no limitation thereto.

Finally, the object/background rendering part 205 may perform rendering through the rendering pipeline of the graphics processor unit (GPU) on the basis of data such as the following.

[Equation 11]

$$\begin{cases} T^{B}_{sRGB_f} = \tilde{P}_{raw \to sRGB} T^{B}_{raw_f} & \text{if foreground (virtualized object)} \\ T^{B}_{sRGB_b} = \tilde{P}_{raw \to sRGB} \tilde{I}^{B}_{raw_b} & \text{if background} \end{cases}$$

According to an embodiment of the present disclosure described above, the texture of a target real object model pre-generated through modeling for a camera imaging process is converted and rendered to be suitable for an extended reality experience environment, thereby improving the visual coherence of the virtualized real object in the extended reality experience environment. In addition, this enables virtual placement-based interaction (for example, movement or rotation) with the real object to provide highly immersive extended reality experiences as if the user were placing the real object in person.

FIGS. 5 to 6 show examples of generating and interacting with a virtualized target real object in an extended reality experience environment using a rendering device 100 according to an embodiment of the present disclosure.

Referring to FIG. 5, the rendering device 100 may use the 3D modeling part 111 to obtain data required for the virtualization of the target real object.

Specifically, a process of virtualization includes detecting and recognizing the target real object from image data of a real space including the target real object captured by a camera, and searching for a 3D model corresponding to the real object. Afterward, the 3D model is aligned with the real object area visible in the obtained image data, thereby achieving virtualization.

Afterward, referring to FIG. 6, interacting with the virtualized target real object, such as moving and rotating, is achieved in the extended reality experience environment as if the user were placing the real object in person, thereby realizing extended reality experiences.

Figure 7:
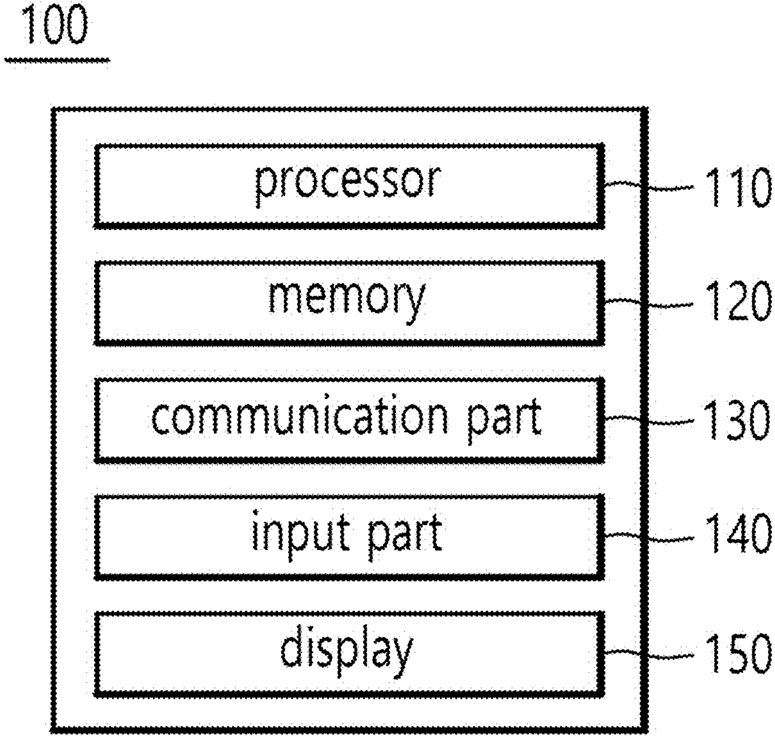
FIG. 7 shows a configuration of a rendering device 100 according to an embodiment of the present disclosure.

FIG. 7 shows a configuration diagram of a rendering device 100 according to an embodiment of the present disclosure.

The rendering device 100 may be a computing device. The computing device may include a processor 110, a memory 120, a communication part 130, an input part 140, and a display 150.

The communication part 130 may use a wired or wireless communication technology to transmit and receive data to and from external devices, such as other electronic devices or servers. For example, the communication part 130 may transmit and receive sensor information, user input, learning models, and control signals to and from the external devices.

The memory 120 may store data that supports various functions of the computing device 100.

The processor 110 may determine one or more executable operations of the computing device 100. In addition, the processor 110 may control the elements of the computing device 100 to perform a determined operation.

To this end, the processor 110 may request, search for, receive, or use data in the memory 120, and may control the elements of the computing device 100 to perform a predicted operation or an operation determined as being preferred among one or more executable operations.

Herein, when connection to an external device is required to perform a determined operation, the processor 110 may generate a control signal for controlling the external device and transmit the generated control signal to the external device.

In order to run an application program stored in memory 120, the processor 110 may control at least some or a combination of the elements of the computing device 100.

The input part 140 may include means for inputting or receiving various types of data, such as sounds, videos, images, and signals as well as user input. The display 150 may output data processed by the processor 110 as audio or visual data.

The computing device 100 according to an embodiment of the present disclosure may transmit and receive data through wireless and/or wired interconnection. Examples of the computing device of the present disclosure may include all types of computing devices capable of computing electronic-formed data.

Those skilled in the art of the present disclosure will understand that various exemplary logic blocks, modules, processors, means, circuits, and algorithm steps described in connection with the embodiment described herein may be realized by electronic hardware, various forms of programs or design codes (for easy description, herein, referred to as software), or a combination thereof.

The above-described present disclosure may be realized as computer-readable code on a medium on which a program is recorded. A computer-readable medium includes all types of recording devices in which data readable by a computer system data is stored. Examples of the computer-readable medium include a hard disk drive (HDD), a solid-state disk (SSD), a silicon disk drive (SDD), a ROM, a RAM, a CD-ROM, a magnetic tape, a floppy disk, and an optical data storage device.

What is claimed is:

1. A rendering method for extended reality, the rendering method comprising:

obtaining, by an image data sensing part, image data in a first condition, the image data including a target real object to be virtualized;

deriving, by a raw-to-sRGB conversion estimation part, a raw-to-sRGB conversion matrix on the basis of the obtained image data in the first condition;

generating, by an object texture data conversion generation part, texture data of the target real object by using the raw-to-sRGB conversion matrix;

virtualizing, by a real-time processing part, the target real object by using the object texture data and generating a virtualized real object;

rendering, by an object/background rendering part, the virtualized real object; and providing, by an object/background rendering part, extended reality experiences.

2. The rendering method of claim 1, wherein the generating of the texture data of the target real object to be virtualized by using the raw-to-sRGB conversion matrix by the object texture data conversion generation part comprises:

deriving a raw-to-raw conversion matrix for estimating raw-to-raw conversion, on the basis of the image data in the first condition and image data in a second condition; and performing conversion into the texture data of the target real object on the basis of the raw-to-raw conversion matrix, and generating the texture data of the target real object by using the raw-to-sRGB conversion matrix.

3. The rendering method of claim 2, wherein the first condition includes a characteristic of lighting or a characteristic of a camera in an environment in which extended reality experiences are provided or both, and the second condition includes a characteristic of lighting or a characteristic of a camera in an environment in which a 3D modeling part operates offline or in a pre-test environment, or both.

4. The rendering method of claim 1, wherein the deriving of the raw-to-sRGB conversion matrix on the basis of the obtained image data by the raw-to-sRGB conversion estimation part comprises:

deriving the raw-to-sRGB conversion matrix on the basis of a reference color chart raw image data and a reference color chart sRGB image data included in the image data of the first condition.

5. The rendering method of claim 1, further comprising:

receiving user input for the virtualized real object; and outputting a screen with updated interaction corresponding to the user input.

6. A rendering device, comprising:

an image data sensing part configured to obtain image data in a first condition, the image data including a target real object to be virtualized;

a raw-to-sRGB conversion estimation part configured to derive a raw-to-sRGB conversion matrix on the basis of the obtained image data in the first condition;

an object texture data conversion generation part configured to generate texture data of the target real object by using the raw-to-sRGB conversion matrix;

a real-time processing part configured to virtualize the target real object by using the object texture data and generate a virtualized real object; and an object/background rendering part configured to render the virtualized real object and provide extended reality experiences.

7. The rendering device of claim 6, wherein when generating the texture data of the target real object to be virtualized by using the raw-to-sRGB conversion matrix, the object texture data conversion generation part is configured to derive a raw-to-raw conversion matrix for estimating raw-to-raw conversion, on the basis of the image data in the first condition and image data in a second condition, perform conversion into the texture data of the target real object on the basis of the raw-to-raw conversion matrix, and generate the texture data of the target real object by using the raw-to-sRGB conversion matrix.

8. The rendering device of claim 7, wherein the first condition includes a characteristic of lighting or a characteristic of a camera in an environment in which the extended reality experiences are provided or both, and the second condition includes a characteristic of lighting or a characteristic of a camera in an environment in which a 3D modeling part operates offline or in a pre-test environment, or both.

9. The rendering device of claim 6, wherein when deriving the raw-to-sRGB conversion matrix on the basis of the obtained image data, the raw-to-sRGB conversion estimation part is configured to derive the raw-to-sRGB conversion matrix on the basis of a reference color chart raw image data and a reference color chart sRGB image data included in the image data of the first condition.

10. The rendering device of claim 6, wherein user input for the virtualized real object is received, and a screen with updated interaction corresponding to the user input is output.

* * * * *